United States Patent [19]
Itoh

[11] Patent Number: 5,966,122
[45] Date of Patent: *Oct. 12, 1999

[54] ELECTRONIC CAMERA

[75] Inventor: Masaharu Itoh, Tokyo, Japan

[73] Assignee: Nikon Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/813,315

[22] Filed: Mar. 10, 1997

Related U.S. Application Data

[60] Provisional application No. 60/023,606, Aug. 9, 1996.

[30] Foreign Application Priority Data

Mar. 8, 1996 [JP] Japan ................................. 8-080942
Oct. 1, 1996 [JP] Japan ................................. 8-260986

[51] Int. Cl.$^6$ ................................................. G06F 15/00
[52] U.S. Cl. ........................ 345/328; 345/348; 348/207; 348/222; 348/232; 348/239
[58] Field of Search ............................. 345/328, 348, 345/349; 348/207, 222, 232, 239, 240, 333

[56] References Cited

U.S. PATENT DOCUMENTS

| | | | |
|---|---|---|---|
| 5,359,712 | 10/1994 | Cohen et al. | 345/328 |
| 5,513,306 | 4/1996 | Mills et al. | 345/473 |
| 5,655,144 | 8/1997 | Milne et al. | 345/302 |

*Primary Examiner*—Ba Huynh
*Attorney, Agent, or Firm*—Oliff & Berridge, PLC

[57] ABSTRACT

An electronic camera displays thumbnails corresponding to source files such as motion picture image files in one window. An operator intuitively performs simple operations on the thumbnails displayed in the window and corresponding source files by selecting, editing and rearranging the thumbnails within the window using drag and drop operations and a menu containing editing options. The operator can use a mouse or a touch screen to perform the drag and drop operations and to select editing options from the menu.

41 Claims, 12 Drawing Sheets

ELECTRONIC CAMERA

This non-provisional application claims the benefit of U.S. Provisional Application No. 60/023,606 filed Aug. 9, 1996 pending entitled "Source File Editor", by Masaharu ITOH

BACKGROUND OF THE INVENTION

1. Field of the Invention

The invention relates to a source file editing apparatus that allows the operator to edit source files, selected as an object for editing, with a simple operation. In particular, the source file editing apparatus allows the operator to display image files as thumbnails on the display screen and to edit the desired image files through an intuitive operation only on the thumbnail display screen. For the purpose of this invention, "editing" is an operation of combining a plurality of files, which are selected as objects of editing, to create a single file. Existing pre-editing files may be replaced by a newly created file. Alternatively, existing files may be maintained while creating a new file through editing. Source files include any file that can be an object of editing, regardless of the pattern or substance of the information contained therein. However, the invention will be described using the example of an image file, for the purpose of simplifying the explanation.

2. Description of Related Art

Currently, image editing software is used for executing high-level image editing on a personal computer. Such software includes, for example, Premiere (manufactured by Adobe, U.S.A.). FIG. 20 shows an image editing screen using a conventional motion picture image editing software. The operator edits the motion picture image on the display area 51. The operator selects the motion picture image file that he wishes to edit from the storage medium through the menu bar 52.

A list of the selected motion picture image files is displayed in the window 53. The operator selects every motion picture image file that he wishes to edit one by one from the motion picture image file list 57. The contents of the motion picture image file selected in the window 53 are displayed on the image display window 54.

One by one, the operator repeatedly selects, by dragging-and-dropping motion picture image files from the window 53 for the time table 56. The operator can reproduce, stop, store or paste the selected motion picture image files through the control buttons 55. In this way, the operator edits a plurality of motion picture image files so that the motion picture image files are arranged in a time sequential order on the time table 56 and are continuously reproduced in the time sequential order when viewed as a motion picture.

Image editing with a conventional image editor (editing software), required a manipulation such as pasting the motion picture image reproduced on the image display window 54 to the time table 56 using the control buttons 55. The operator had to simultaneously display two or more windows on the display area 51. Thus, with such a conventional image editing software, it was difficult for the operator to perform image editing on a small-sized display screen.

When conventional technology is used to realize a small, portable source file editing apparatus, each displayed window is extremely small, which makes it difficult to distinguish the outline of the image. Accordingly, it is difficult for the operator to identify the images displayed in the windows. Moreover, since the window 53 that displays the motion picture image file list 57 is also very small, an operator will have difficulty quickly selecting an image file from the motion picture image file list 57. Furthermore, if a touch panel is used for selection of motion picture image files, the small size of the display windows in the display area 51 will prevent the operator from quickly selecting a desired image file because the tip of the operator's finger is large relative to the window area on the display screen.

Still further, in conventional image editing software, because editing is performed using many windows, it takes time for the operator to learn the editing operations. Conventional image editing software is complicated and can therefore be troublesome for operators, especially beginners, to skillfully use a multitude of windows.

SUMMARY OF THE INVENTION

In order to overcome such problems, the invention provides an electronic camera that allows the operator to select a desired source file for editing using intuitive and simple operations. The invention further provides a superior portable source file editing apparatus.

The invention also allows the operator to reliably combine two source files using intuitive operations. The invention further provides an electronic camera that is capable of performing special effect compositions of two source files in a reliable manner through operations that are intuitive to the operator.

The invention further provides an electronic camera that realizes a variety of editing operations for any of the source files selected for editing.

The invention provides an electronic camera that is capable of after-recording an audio file on an image file, i.e., combining an audio file and an image file, using operations that are intuitive to the operator. The invention likewise provides an electronic camera that can edit source files and rearrange thumbnails.

The invention also provides an electronic camera that allows the operator to clearly identify the thumbnail image selected for editing. The invention likewise provides an electronic camera that allows the operator to easily identify the thumbnail image corresponding to the edited source file.

The invention provides an electronic camera that is capable of combining a still image with other source files via an operation that is intuitive to the operator.

The electronic camera of the present invention includes an image pick-up unit, a recording device, a manipulation reading device for reading the drag-and-drop and a display device. The image pick-up unit includes a photoelectric converter that receives an image and outputs image information. The recording device stores a source file containing the image information or audio information. The display device displays source files containing image information or audio information as thumbnails on the screen and moves the thumbnail from a drag-and-drop start position to a drag-and-drop end position as the operator drags-and-drops the thumbnail. The camera further includes a file management device that selects for editing a source file corresponding to the drag-and-drop start position, and a source file corresponding to the drag-and-drop end position.

Thumbnail images (i.e., size-reduced images or partial images) can be displayed on the entire area of the display screen. If the size of an image is originally small, or if a single image is displayed on the entire screen, it is not necessary to reduce the image display size or to cut off part of the image display. Thus, the term "thumbnail display"

includes not only a reduced thumbnail image but also displays of the source files in their original size. Further, in the case of a motion picture image, the term "thumbnail" includes a reduced display or a part display, with regard to one scene (e.g., one frame) of the motion picture image.

During editing, the operator performs a drag-and-drop operation to a thumbnail on the screen using a touch panel or mouse. Thus, the manipulation reading device can include a mouse or a touch panel. Generally, a drag-and-drop operation is performed with a mouse. The operator selects a displayed item by pressing a mouse button when a mouse controlled cursor corresponds to one displayed item. The operator moves the mouse while pressing the mouse button to drag the selected item, and then releases the mouse button at a prescribed position to drop thereby repositioning the selected item.

The drag-and-drop operation can also be performed using a touch panel that detects a position of a contact body in contact with the display screen. The contact body can be the operator's finger, or an object such as a pen or the like. In this case, the operator touches the touch panel with a finger to select a displayed item. The operator then drags the selected item by moving his finger along the touch panel while maintaining contact with the touch panel. To drop the selected item at a prescribed position, the operator lifts his finger away from the touch panel to release contact with the touch panel. The touch panel gives a high interactive quality and is easily operated by beginners.

When the operator performs a drag-and-drop operation, the manipulation reading device reads the drag start position and the drop position, i.e., the drag end position, selected by the operator. When the operator starts the drag manipulation on the screen, the thumbnail that was located at the drag start position moves to follow the drag manipulation. The operator can perform the drop operation on a separate thumbnail displayed on the screen.

The file management device takes in the drag-and-drop start position and the drag-and-drop end position, and selects for editing the source files corresponding to the thumbnails at the start and end positions, respectively. Thus, the operator can intuitively select at least two source files through a single drag-and-drop manipulation.

The display device displays an editing menu on the screen after dragging-and-dropping operation is accomplished. The file management device edits the selected source files corresponding to the drag-and-drop start and end positions, in accordance with an editing item selected from the editing menu by the operator.

The selected source files can also be edited as a result of the drag-and-drop operation. For example, the display device detects the drag-and-drop end position read by the manipulation device. If the end position is located near a region between two thumbnails on the screen, the display device displays the thumbnail corresponding to the drag-and-drop start position between the two thumbnails, thus rearranging the order of the thumbnails on the screen.

When an image file and an audio file are selected for editing through the operator's drag-and-drop manipulation, the file management device can edit the source files so that the image file and the audio file selected through dragging-and-dropping are simultaneously reproduced when viewed as a motion picture. In particular, the file management device can automatically edit the two files so that the audio file is identified and is after-recorded (i.e., superimposed) on the image file.

The file management device can also execute special effect composition (such as overlap, chroma-key, fade-in, fade-out, wipe, etc.) using the two selected source files corresponding to the drag-and-drop start and end positions.

In the editing process, the file management device combines the selected source files corresponding to the drag-and-drop start and end positions in a time sequential manner so that the two source files are continuously reproduced when viewed as a motion picture. Moreover, there is no particular limit with regard to the order in which the two source files are reproduced.

The file management device can distinguish a still image file from other files. If one of the source files selected for editing is a still image file, the file management device can combine the still image file with the other source file in a manner such that the still image file is reproduced for a predetermined period of time when viewed in a motion picture.

The display device can also indicate that source files corresponding to thumbnails have been selected for editing by changing the display form of the thumbnails to a predetermined display form. The display device can also indicate that a source file has been edited by changing the display form of the corresponding thumbnail to a different, predetermined display form.

Other objects, advantages and salient features of the invention will become apparent from the detailed description taken in conjunction with the annexed drawings, which illustrate preferred embodiments of the invention.

BRIEF DESCRIPTION OF THE DRAWINGS

The invention will be described in detail with reference to the following drawings in which like reference numerals refer to like elements and wherein.

DETAILED DESCRIPTION OF PREFERRED EMBODIMENTS

Figure 1:
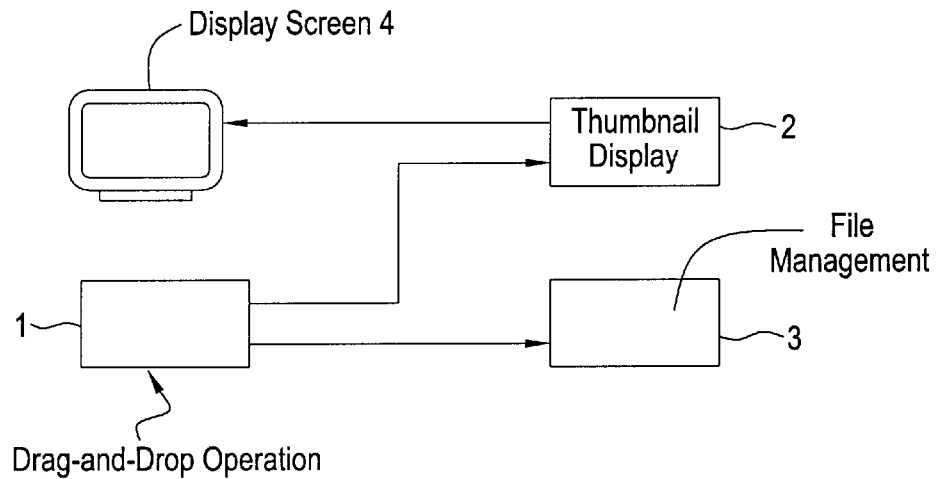
FIG. 1 is a block diagram illustrating a block diagram of the invention.

FIG. 1 is a block diagram illustrating the invention. A manipulation reading device 1, a display device 2 having a display screen 4 and a file managing device 3 are shown in FIG. 1.

Figure 2:
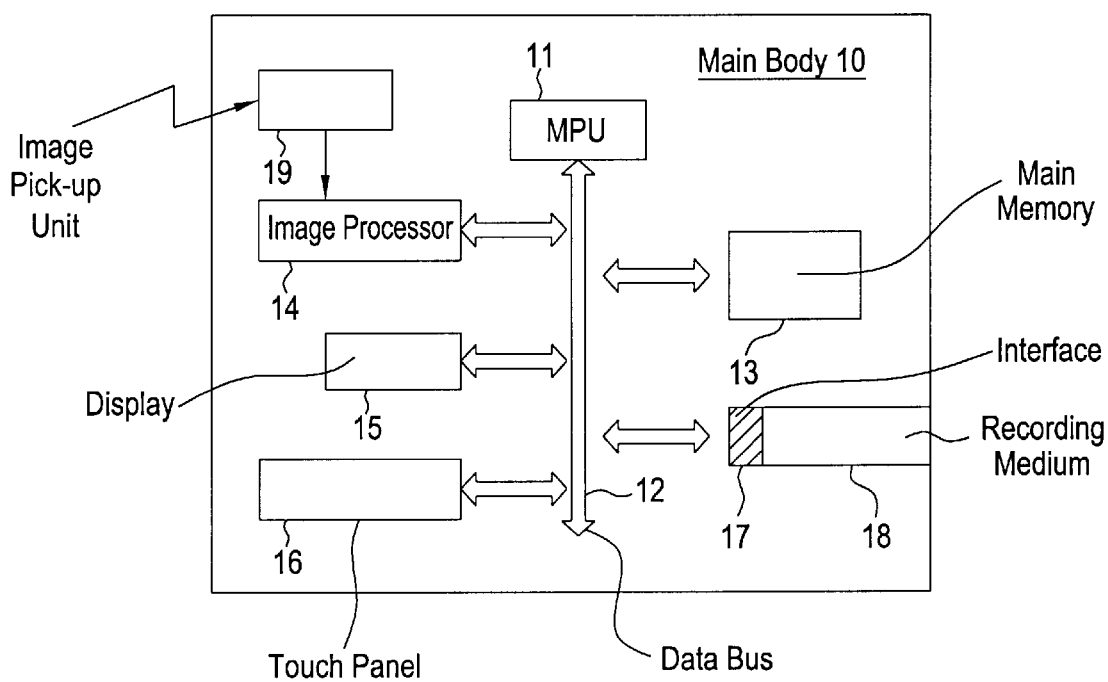
FIG. 2 is a block diagram of a device according to a first preferred embodiment of the present invention.

A functional block diagram of a first preferred embodiment of a source file editing apparatus according to the present invention is illustrated in FIG. 2. The source file editing apparatus of FIG. 2 is an electronic camera. As shown in FIG. 2, multi-processing unit (MPU) 11 is positioned in a main body 10 of the source file editing apparatus. The MPU 11 is connected via a data bus 12 to main memory 13, image processor 14, display 15 and touch panel 16. The main memory 13 is used to temporarily store data during editing. A touch tablet (special-purpose manipulation stand), as well as a mouse or the like, can be used instead of the touch panel 16.

A recording medium 18 is connected to the data bus 12 through an interface 17. The recording medium can be located external to the main body 10. An input terminal of image processor 14 is connected to an output terminal of image pick-up unit 19.

The display 15 is a liquid crystal display device, and the touch panel 16 is incorporated in the display 15 to enhance portability of the editing apparatus. However, if the editing apparatus is used and stored on a desk or the like, a cathode ray tube (CRT) may also be used, and the touch panel can be incorporated in the CRT.

Moreover, the manipulation reading device 1 can correspond but is not limited to the touch panel 16. Similarly, the display device 2 can correspond but is not limited to a display controller of the MPU 11 and the display 15, and the file management device 3 can correspond, but is not limited to the file manager of MPU 11.

Figure 3:
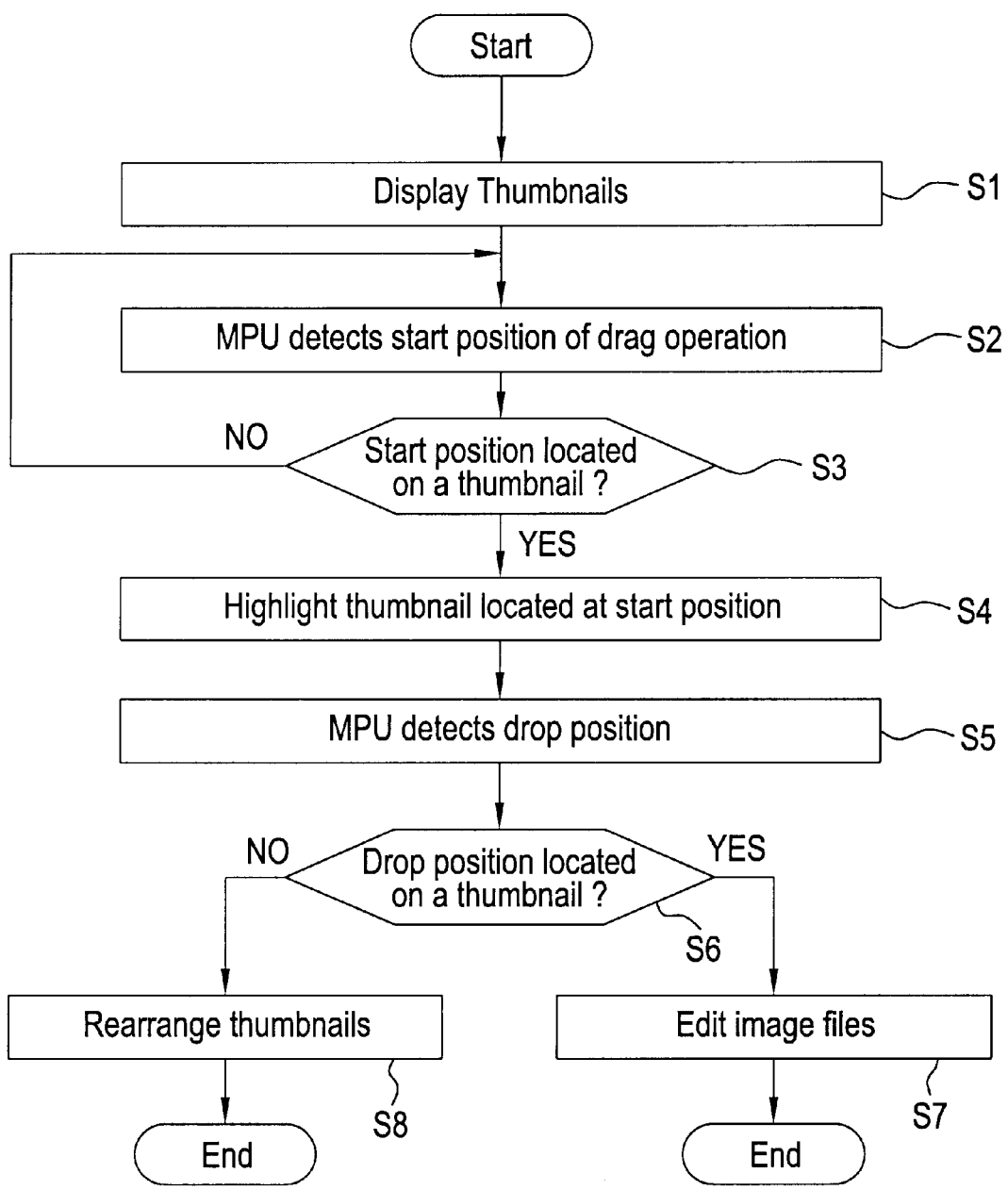
FIG. 3 is a flowchart outlining an operation of the first embodiment.

A flowchart explaining operations of the first embodiment is shown in FIG. 3. The operations of the first embodiment will now be described with reference to FIGS. 2, 3, 6–17.

The image pick-up unit 19 is configured as a small-size unit including a charge-coupled device (CCD) and lens. The image pick-up unit 19 photoelectrically converts the external image conducted to the CCD via the lens to an electric signal and outputs the electric image signal to the image processor 14. The image processor 14 digitizes the image signal and performs data compression and encoding as would be known to one of ordinary skill in the art of image compression and encoding.

The image signal processed by the image processor 14 can be stored in the recording medium 18 as an image file. Moreover, image files stored in the recording medium 18 can be defined as a motion picture image file.

Figure 6:
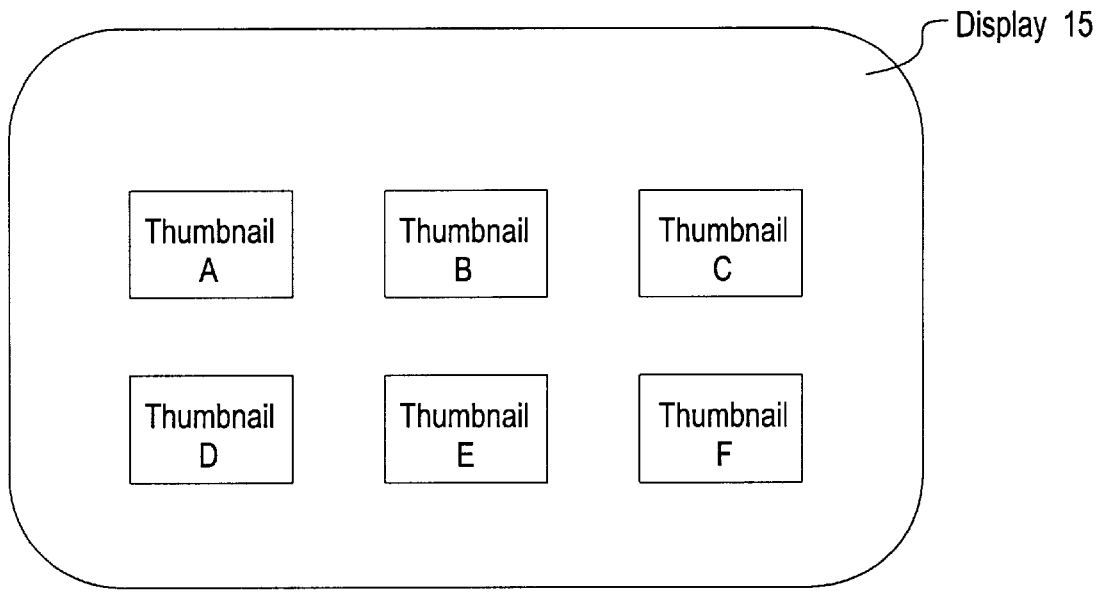
FIG. 6 shows a thumbnail display screen for editing source files using displayed thumbnails.

The display controller (not shown) of the MPU 11 reads a plurality of motion picture image files from the recording medium 18, creates thumbnails for leading scenes of respective motion picture image files and starts the process shown in FIG. 3. First, in step S1, the plurality of thumbnails for motion picture image files are displayed as a list in the display 15. As shown in FIG. 6, the thumbnails from six motion picture image files are displayed as thumbnails A–F. The MPU 11 obtains various attributes, such as the class of files (i.e., motion picture or still image file), image data amount, the number of frames, creation date, the title, etc. for each displayed file. By making the attributes write-protectable, erroneous deletion of image files can be prevented. From step S1, control advances to step S2.

In step S2, when the operator contacts the touch panel 16 with his finger or the like, the MPU 11 detects that position. From step S2, control advances to step S3 in which the MPU 11 determines whether the detected position is on or corresponds to any of the A–F thumbnails. From step S3, control advances to step S4 if the determination in step S3 is affirmative. If the determination in step S3 is negative, control returns to step S2.

Figure 7:
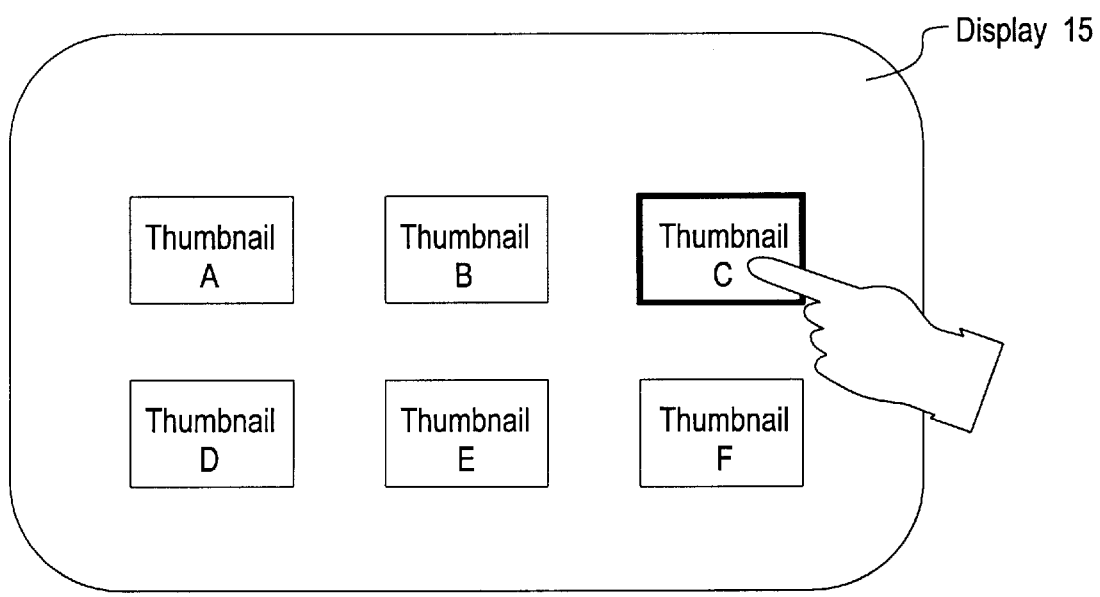
FIG. 7 illustrates an operator selecting a thumbnail displayed on the screen of FIG. 6.

In step S4, the MPU 11 determines whether the detected position is on a thumbnail. If the detected position is on a thumbnail, the MPU 11 determines that the operator has selected that thumbnail and the motion picture image file corresponding to that thumbnail. The display of the display frame of the selected thumbnail is highlighted. FIG. 7 shows the case in which the thumbnail C is selected. From step S4, control advances to step S5.

Figure 8:
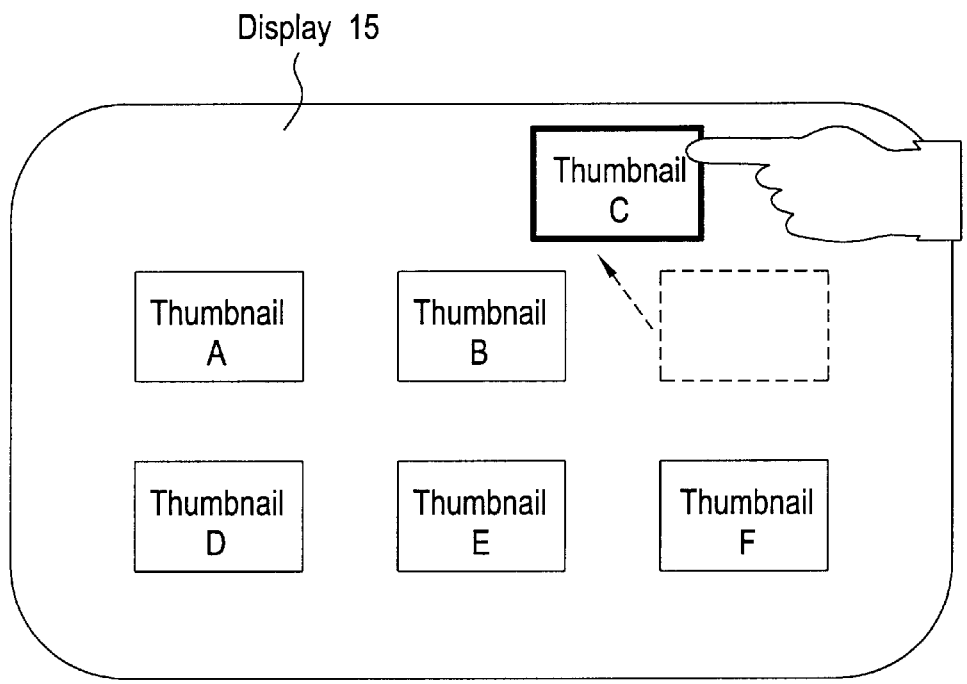
FIG. 8 illustrates an operator editing source files using thumbnails displayed on the screen of FIG. 6.
Figure 9:
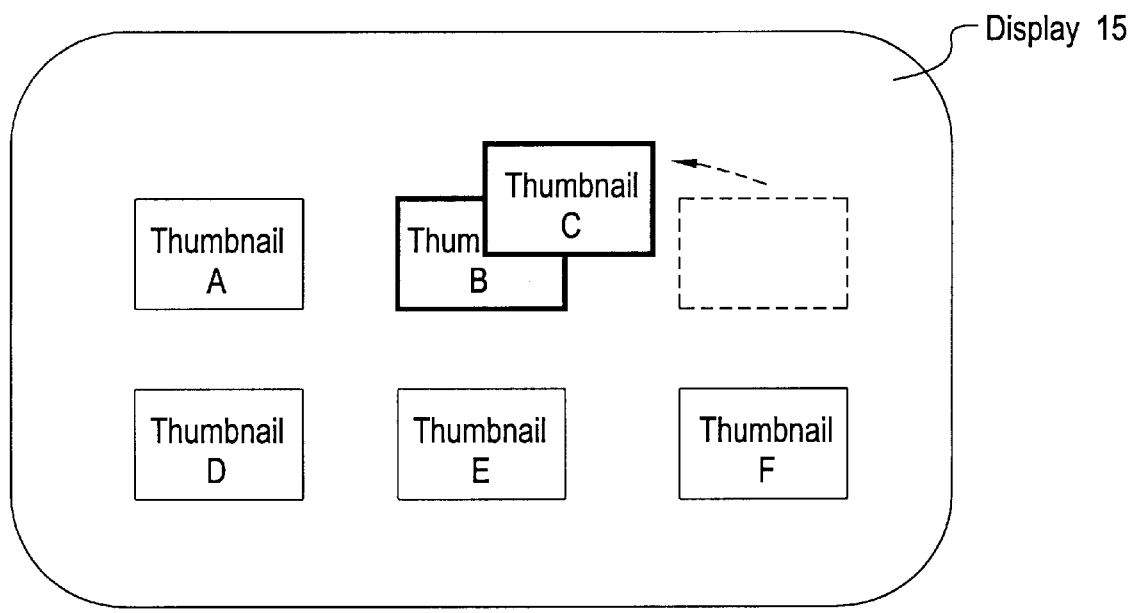
FIG. 9 shows two selected thumbnails displayed on the screen of FIG. 6.

As the operator moves his finger on the touch panel 16 without removing his finger from the screen (dragging manipulation), the selected thumbnail C moves in a following (trailing) manner as shown in FIG. 8. At this time, preferably, the image of the thumbnail should follow, but it is acceptable if only the display frame of the thumbnail follows. Moreover, it is a conventionally known advantage to use a Graphical User Interface (GUI), or the like, for the operator to manipulate the thumbnail via a touch panel, so its detailed explanation is omitted.

In step S5, when the operator removes his finger from the touch panel 16 as part of the dropping operation, the MPU 11 detects the position as the drag-and-drop end position. From step S5, control advances to step S6.

Figure 10:
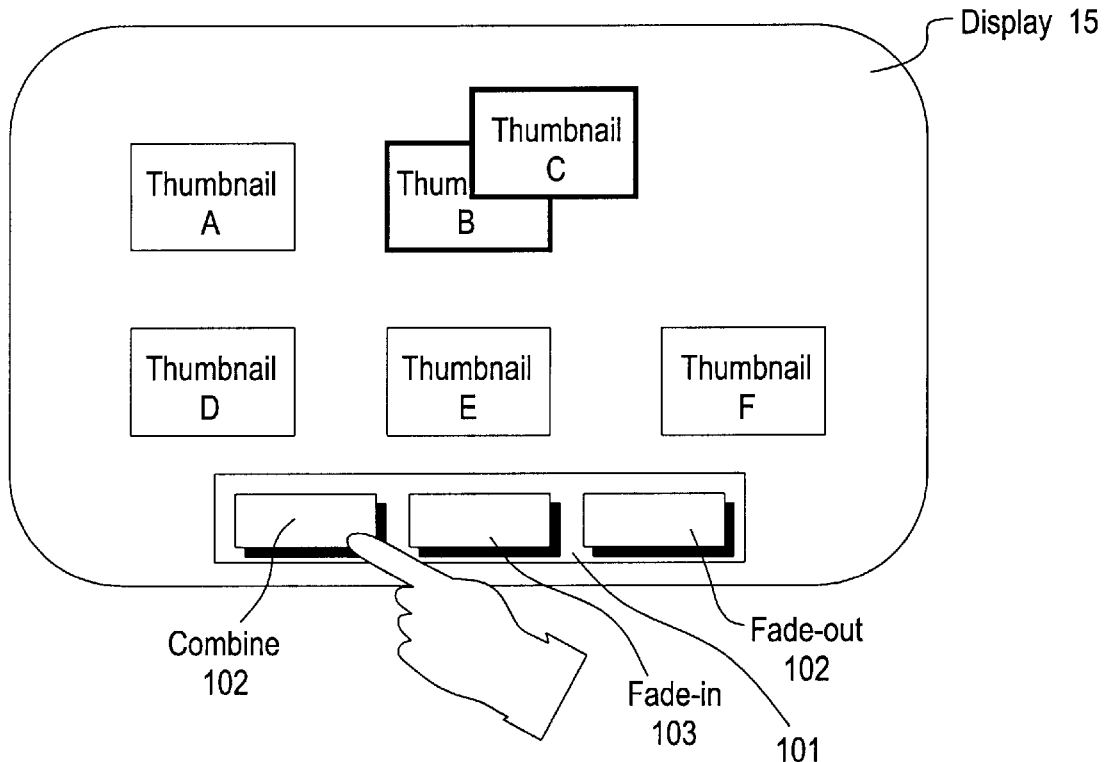
FIG. 10 shows a thumbnail display screen displaying an editing menu for editing two motion picture image files corresponding to selected thumbnails displayed on the screen.

In step S6, if the position where the operator removes his finger is located on a second thumbnail, the MPU 11 determines that the second thumbnail and the motion picture image file corresponding to second thumbnail have been selected. As shown for example in FIG. 9, the display controller of the MPU 11 highlights the display frame of the newly selected thumbnail B and overlaps the two thumbnails. Simultaneously, the MPU 11, as shown in FIG. 10, displays an editing menu 101 of the two motion picture image files on the lower part of the display 15. When the determination in step S6 is affirmative, control advances to step S7.

In step S7, the operator touches the edit menu and chooses a method to edit the two motion picture image files. The file manager of the MPU 11 edits the image files according to that editing method. For example, the operator can select a "combining" button 102 on the menu 101 as shown in FIG. 10. The file manager of the MPU 11 combines and edits the two motion picture image files selected by the operator. After the motion picture image files corresponding to the thumbnails B and C are combined, the two motion picture image files are edited so they are continuously reproduced when viewed as a motion picture. Thus, the file manager of the MPU 11 can realize a newly created motion picture image file combined from the two motion picture image files.

When a "fade-in" 103 button on the menu 101 is selected, the motion picture image file corresponding to the thumbnail B is edited so that the image continues after being reproduced when viewed as a motion picture. In this case, the motion picture image file corresponding to thumbnail C is edited so that it is reproduced in fade-in form when viewed as a motion picture. When a "fade-out" button 103 on the menu 101 is selected, the motion picture image file corresponding to the thumbnail B is edited so that the image continues after being reproduced as fade-out when viewed as a motion picture. In this case, the motion picture image file corresponding to thumbnail C is edited so that it is reproduced after the image file corresponding to thumbnail B when viewed as a motion picture.

Figure 11:
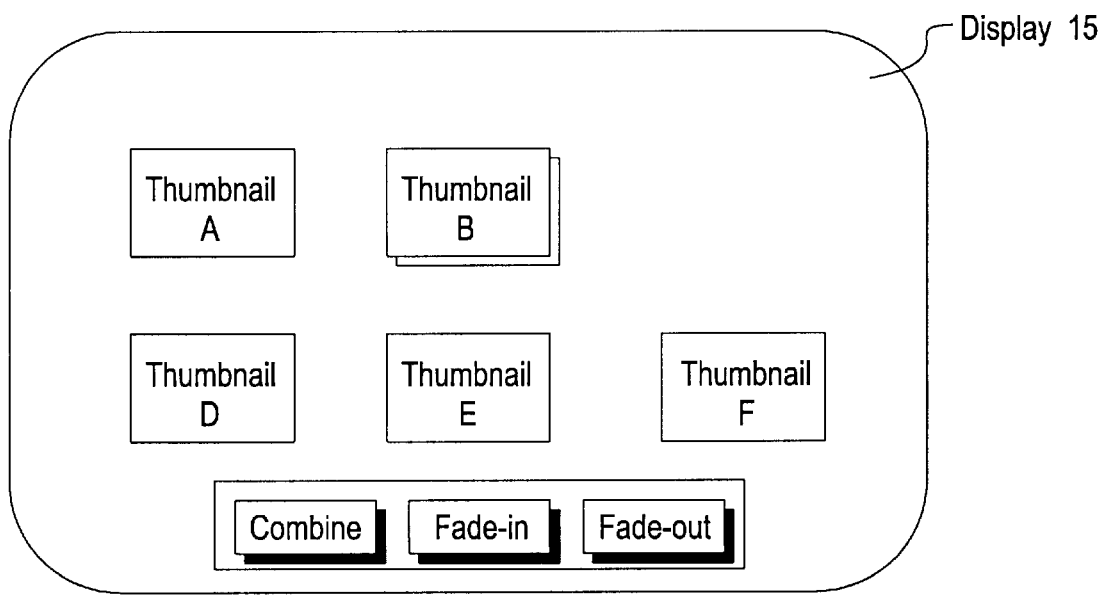
FIG. 11 illustrates a thumbnail display screen displaying thumbnails that are integrated to indicate combination editing of two motion picture image files that correspond to the integrated thumbnails.

The MPU 11, when editing two motion picture image files, integrates and displays the two thumbnails selected for editing as one thumbnail. FIG. 11 shows the case in which the display of the thumbnails B and C are changed in the display 15 to indicate the combination editing of the motion picture image files corresponding to thumbnail B and thumbnail C, respectively. The creation date of the file attribute is changed to reflect the date the editing was performed.

Figure 12:
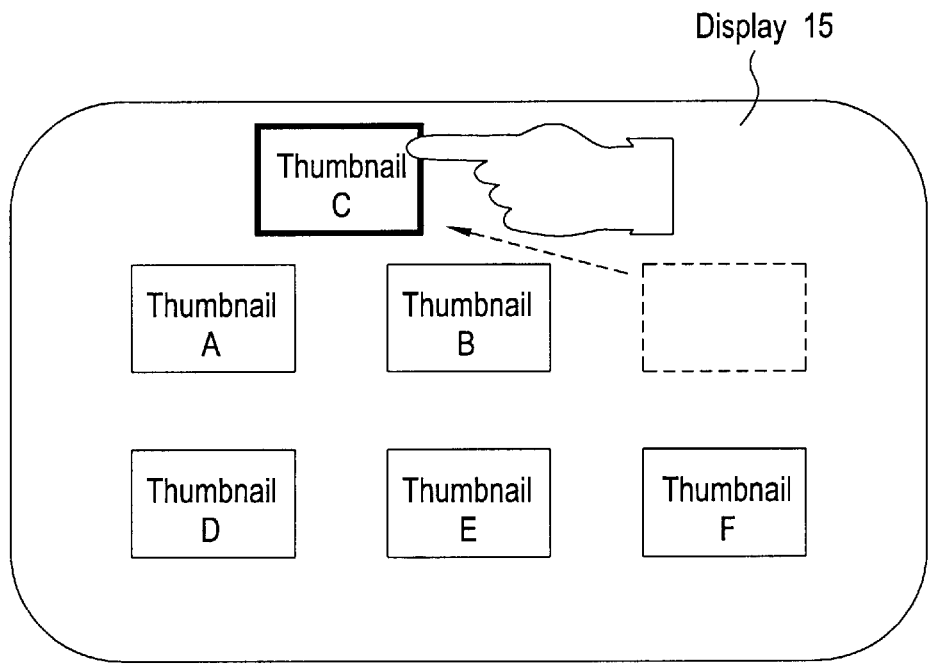
FIG. 12 shows an operator dragging a thumbnail to insert it between two other thumbnails using a thumbnail display screen.
Figure 13:
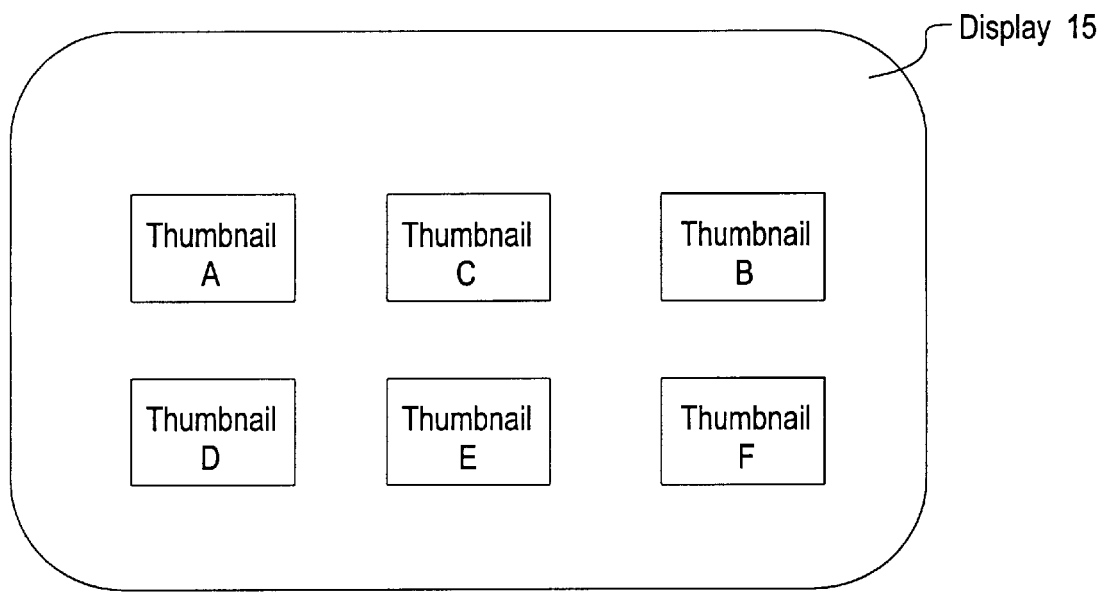
FIG. 13 shows the dragged thumbnail of FIG. 12 inserted between two other thumbnails.
Figure 14:
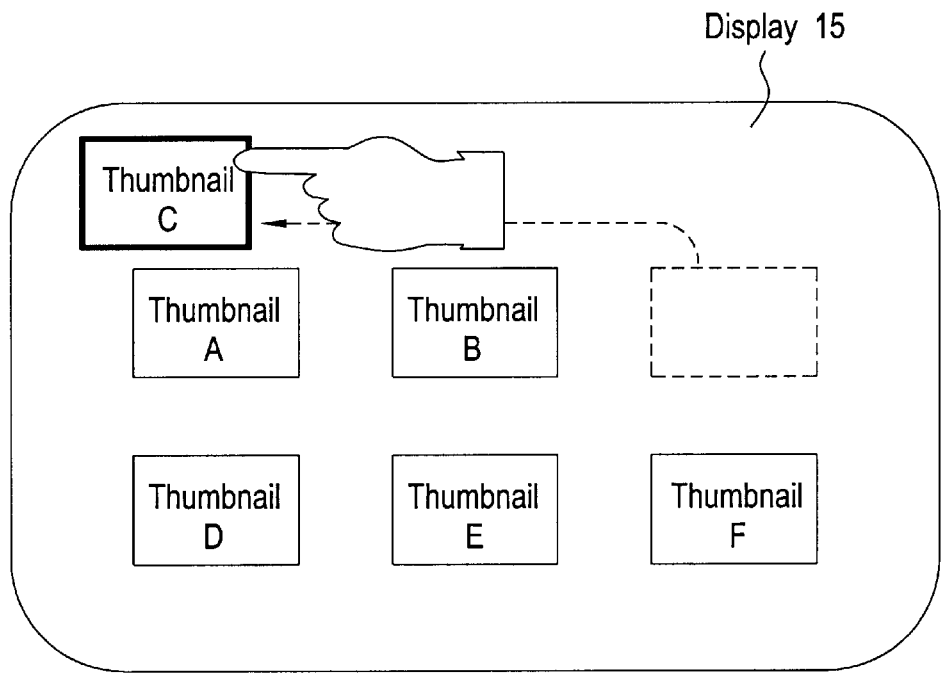
FIG. 14 shows an operator dragging a first thumbnail to insert it between a second thumbnail and a border of the display screen.
Figure 15:
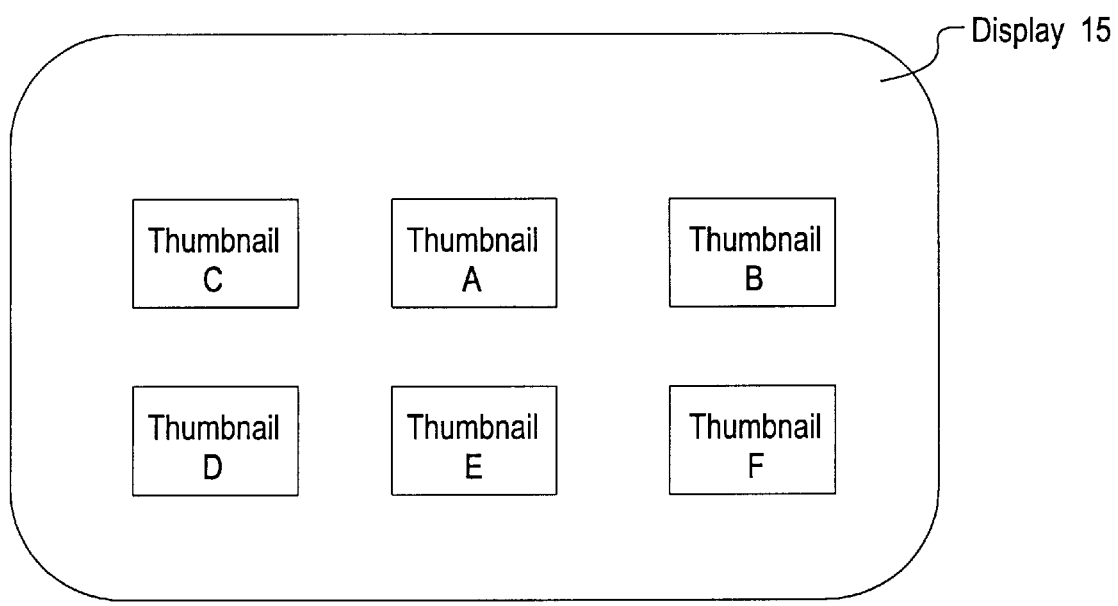
FIG. 15 shows the dragged thumbnail of FIG. 14 inserted between the second thumbnail and the border of the display screen.

If the determination in step S6 is negative, control continues to step S8. In step S8, as shown in FIG. 12, when the position where the operator removed his finger from the touch panel 16 is between thumbnails, the display controller of the MPU 11 inserts the drag-manipulated thumbnail between two thumbnails. Then, as shown in FIG. 13, displays the new rearranged thumbnails. Moreover, "between the thumbnails," as shown in FIG. 14, includes being between the thumbnail and the display screen frame. In this situation, the thumbnails are rearranged at this time as shown in FIG. 15. From both steps S7 and S8 the operation ends.

Further, the source file editing apparatus informs the operator when the operator's finger is located on a displayed thumbnail by highlighting or otherwise changing the displayed thumbnail. This feature is useful when the operator desires to drop a dragged thumbnail between two displayed thumbnails or between a displayed thumbnail and a border of the display, as shown for example in FIGS. 12 and 14. For example, when a displayed thumbnail is highlighted, the highlighting indicates to the operator that the dragged thumbnail is on the highlighted, displayed thumbnail rather than between thumbnails or between a thumbnail and display border.

Gaps between thumbnails or between thumbnails and display borders can be narrower than the width of the operator's finger. In this situation, a subset of area of a thumbnail can be defined, preferably near the center of the thumbnail, so that the operator can select the thumbnail only by touching the defined area of the thumbnail with his finger. Thus, the operator can drop a dragged thumbnail between two displayed thumbnails separated by a narrow gap because the operator's finger can cover the gap and touch portions of the two displayed thumbnails without touching the defined areas of the two displayed thumbnails.

Next, the case in which an audio file is included in the recording medium 18 will be explained. In this case, the MPU 11 compares the file attribute of the file read from the recording medium 18, and determines whether the file is an audio file. If the file is an audio file, the icon image for the prestored audio file is read out, and is displayed as a thumbnail. A symbol icon is used for the thumbnail. Alternatively, an icon that images a sound can be used. For example, a speaker icon or the like can be used.

Figure 16:
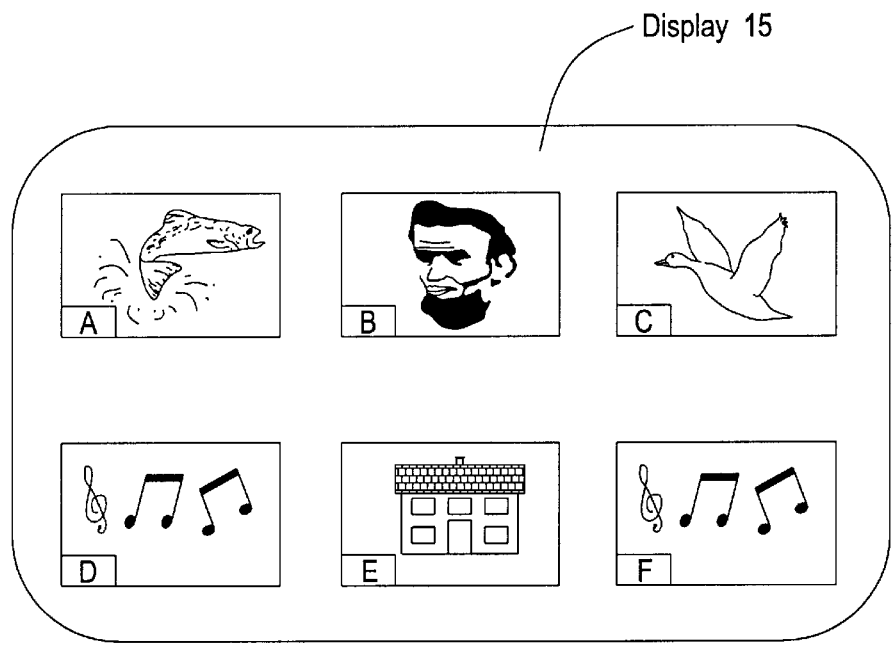
FIG. 16 shows an example of a thumbnail display screen.
Figure 17:
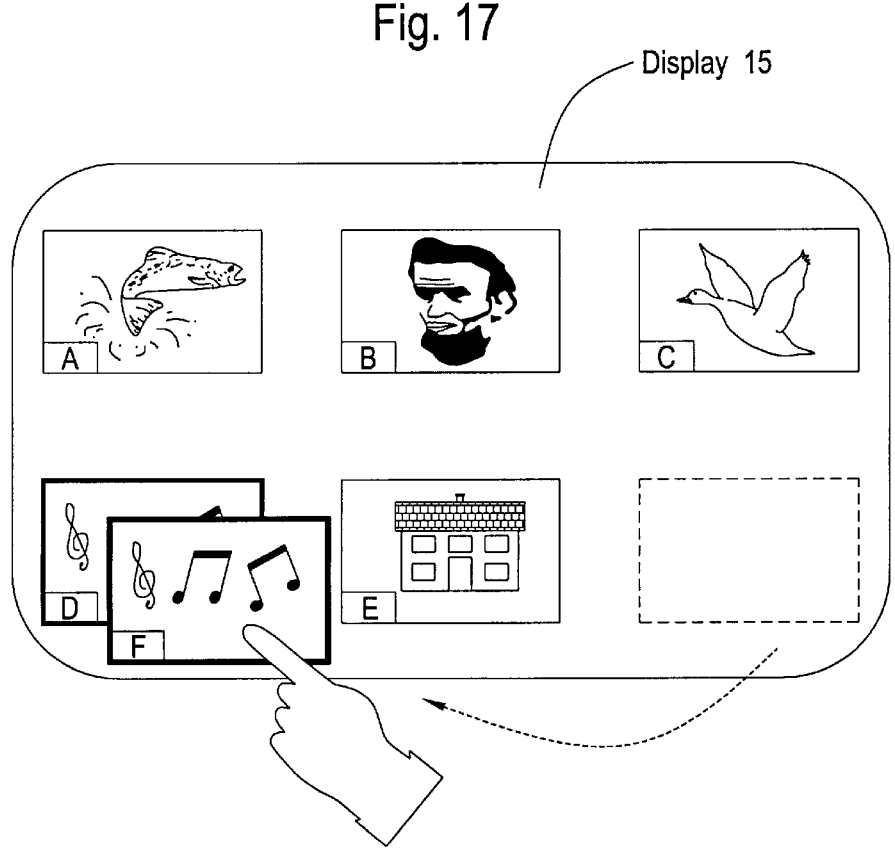
FIG. 17 shows an example of a thumbnail display screen.

As shown in FIG. 16, thumbnails A, B, C, and E are thumbnails of motion picture image files and thumbnails D and F are thumbnails of audio files. As shown in FIG. 17, according to the drag-and-drop operation performed by the operator, thumbnail F is superimposed on thumbnail D to be combined, in the same way as motion picture image files combined. Thus, the two audio files are combined and edited so that they are in a continuously reproduced form. Thus, the file manager of the MPU 11 can realize a newly created audio file based on the two audio files. The MPU 11 can also integrate two thumbnails after editing, and display the integration as one thumbnail.

Similar to the above-described motion picture image files, at least the editing effects of combining fade-in and fade-out can be edited on audio files.

In this way, by using an icon, files other than motion picture image files can be displayed in the same way as motion picture image files. Accordingly, the invention can handle files other than motion picture image files.

The invention can also enable the operator to select from multiple types of icons, or identify a similar file and corresponding thumbnail by displaying identifying information such as file name, image creation date, control number, or the like.

There are no limitations on the information used for identification. Colors can be used to provide identifying information or to indicate whether a thumbnail has been selected or edited. For example, different icons can be colored differently. In addition, the operator can change the name of a thumbnail or input a file name at any time.

Thus, in the first embodiment, a plurality of thumbnails are displayed in the entire display area, and the operator edits a moving picture file by performing a drag-and-drop operation on the thumbnail corresponding to the moving picture file.

Consequently, because there is no simultaneous display of multiple windows as in the prior art, and the thumbnails are displayed arranged only on a single screen, the display space can be utilized effectively, and a portable small-scale source file editing apparatus can be realized.

In particular, because the thumbnails can be displayed across the entire region of the screen, the individual thumbnails can be displayed as large as possible even in a portable small-scale source file editing apparatus. Consequently, the thumbnails are easy to see, and the operator can easily discriminate the images.

Also, because the thumbnails can be displayed as large as possible, selection of the thumbnails can be performed correctly and quickly. In particular, when using a touch panel, the operator can more easily select a thumbnail because the area of the thumbnail is larger relative to the contact area of the operator's finger than if the thumbnail were small.

In addition, two thumbnails and their corresponding moving picture files can be selected by a single drag-and-drop operation. Consequently, the number of necessary operations the operator must perform to select thumbnails is halved in comparison with the prior art, thus reducing the time required for editing.

Since the operator need not activate multiple windows on the screen, the time required for an operator to learn the editing operation is greatly reduced. Furthermore, the operator can perform two operations, namely, "selection of thumbnails" and "rearrangement of thumbnails", with a single drag-and-drop manipulation.

Also, because the display form of the thumbnails changes on the screen during selection of the files corresponding to the thumbnails and after editing of the files, the operator can clearly identify the files which have been selected for editing and which files have been edited.

In a second preferred embodiment, the operator can select a motion picture image file and an audio file through drag-and-drop, and can after-record the audio file on the motion picture image file. The configuration of the second embodiment is the same as that of the first embodiment, and the same elements have the same numerical references as in the first embodiment. Therefore, explanation of the configuration itself will be omitted.

Figure 4:
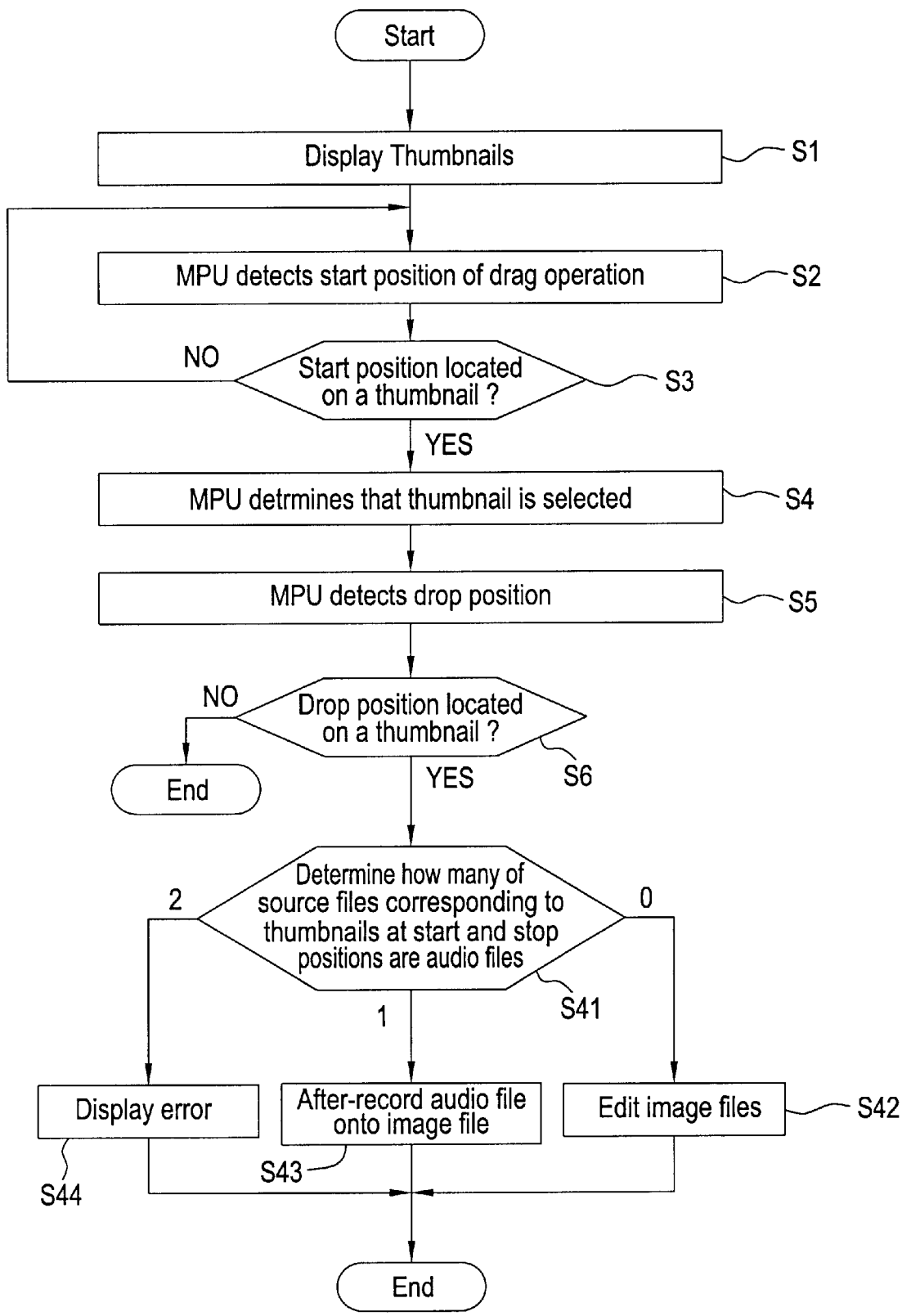
FIG. 4 is a flowchart outlining an operation of a second preferred embodiment according to the present invention.
Figure 18:
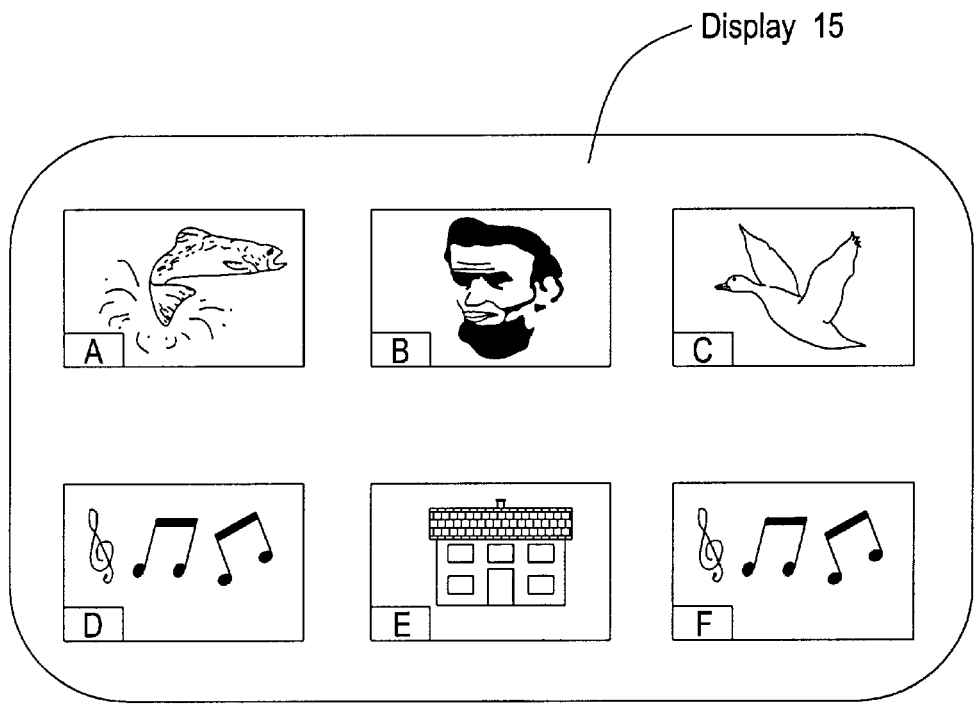
FIG. 18 shows thumbnail display screen displaying thumbnails of moving picture files, and thumbnails of audio files.
Figure 19:
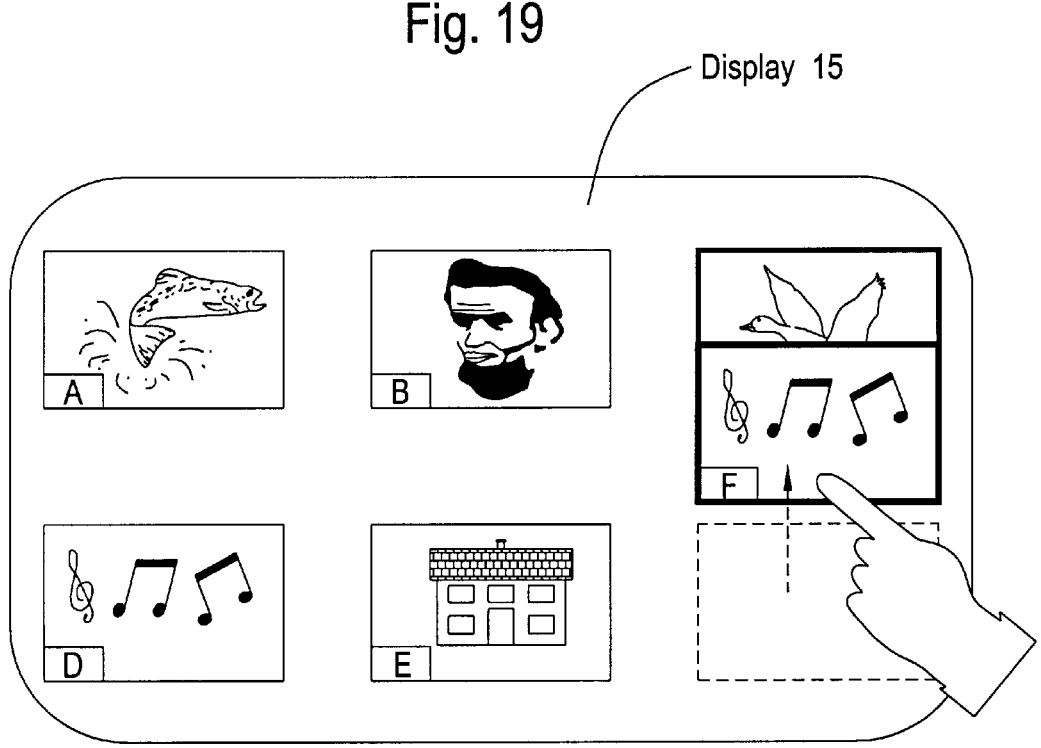
FIG. 19 shows an operator dragging a first thumbnail and dropping it on a second thumbnail.
Figure 20:
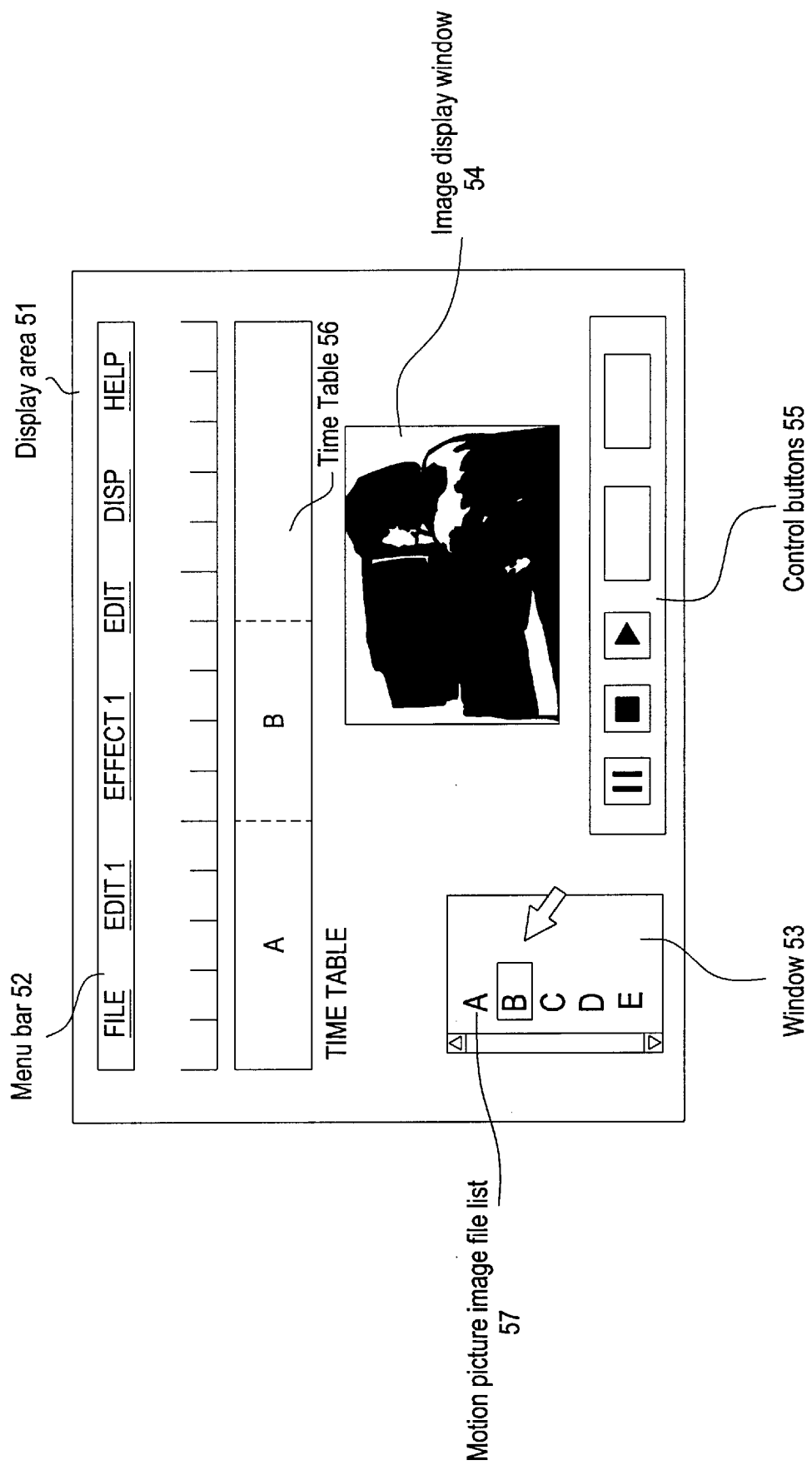
FIG. 20 shows an image editing apparatus according to the prior art.

FIG. 4 is a flow chart explaining the working of the second embodiment, and FIG. 18 and FIG. 19 are drawings showing a plurality of thumbnails in a display 15 according to the second embodiment. As shown in FIG. 2, image pick-up unit 19 photoelectrically converts an external image to electric signals and outputs the image signal to the image processor 14. The image signal processed by the image processor 14 is stored on the recording medium 18 as a motion picture image file. In the second embodiment, at least two types of source files, moving picture files and audio files, are recorded in the recording media 18.

The display controller of the MPU 11 reads the source files (motion picture image files and audio files) from the recording medium 18 and starts the process shown in FIG. 4. Steps S1–S6 in the second embodiment are the same as the first embodiment with the exception that audio source files are stored in the recording medium 18. Thus, detailed explanation of steps S1–S6 will be omitted. Accordingly, for example, step S1 of FIG. 4 can display the thumbnail of an audio file is displayed using a graphical representation, such as an icon. At this time, the MPU 11 obtains various attributes, such as the class of the source files (motion picture image file or audio file), data amount in the source files, the number of frames, file creation date, title, etc.

The thumbnails of the audio files use graphic representations such as icons as described in the first preferred embodiment. As shown in FIG. 18, thumbnails A, B, C, and E are thumbnails of moving picture files, and thumbnails D and F are thumbnails of audio files.

However, in the second embodiment if the decision in step S6 is negative, the process ends. However, if the decision in step S6 is affirmative, control advances to step S41. As shown in FIG. 19, if the position where the selected thumbnail is dropped is on a second thumbnail, the MPU 11 determines that the second thumbnail and its corresponding file was selected.

In step S41 of FIG. 4, the MPU 11 examines the attributes of the two selected files and determines whether one or both of the selected files is an audio file.

When neither of the selected files is determined to be an audio file in step S41, the two files are moving picture files. Thus, control advances to step S42. In step S42, the two files can be processed by the editing of moving picture files described above with respect to the first embodiment. Here, the file manager of the MPU 11 edits the two moving picture files in a format that links and sequences the two moving picture files. The linkage order of the moving picture files at this time is predetermined.

When it is determined in step S41 that one of the two selected files is a moving picture file and the other is an audio file, as shown in FIG. 19, control advances to step S43. In step S43, the file manager of the MPU 11 edits the two files in a format wherein the audio file is after-recorded on the moving picture file. This can be realized by newly creating a file in a format capable of simultaneously reproducing the audio file by time-division processing during reproduction of the moving picture file.

When it is determined in step S41 that each of the two selected files is an audio file, control continues to step S44. In step S44, the MPU 11 displays an error to the display 15 because editing of the files is not intended. From steps S42, S43 and S44, the process ends.

Thus, in the second embodiment, the operator can select a motion picture image file and an audio file through drag-and-drop, and can after-record the audio file on the motion picture image file.

In a third preferred embodiment, the operator can select both a motion picture image file and a still image file as a subject for editing, and can combine the motion picture image file and the still image file.

An explanation of the configuration of the third embodiment will be omitted, since it is the same as that of the first embodiment (shown in FIG. 2). The same numerical references are assigned to the same elements.

Figure 5:
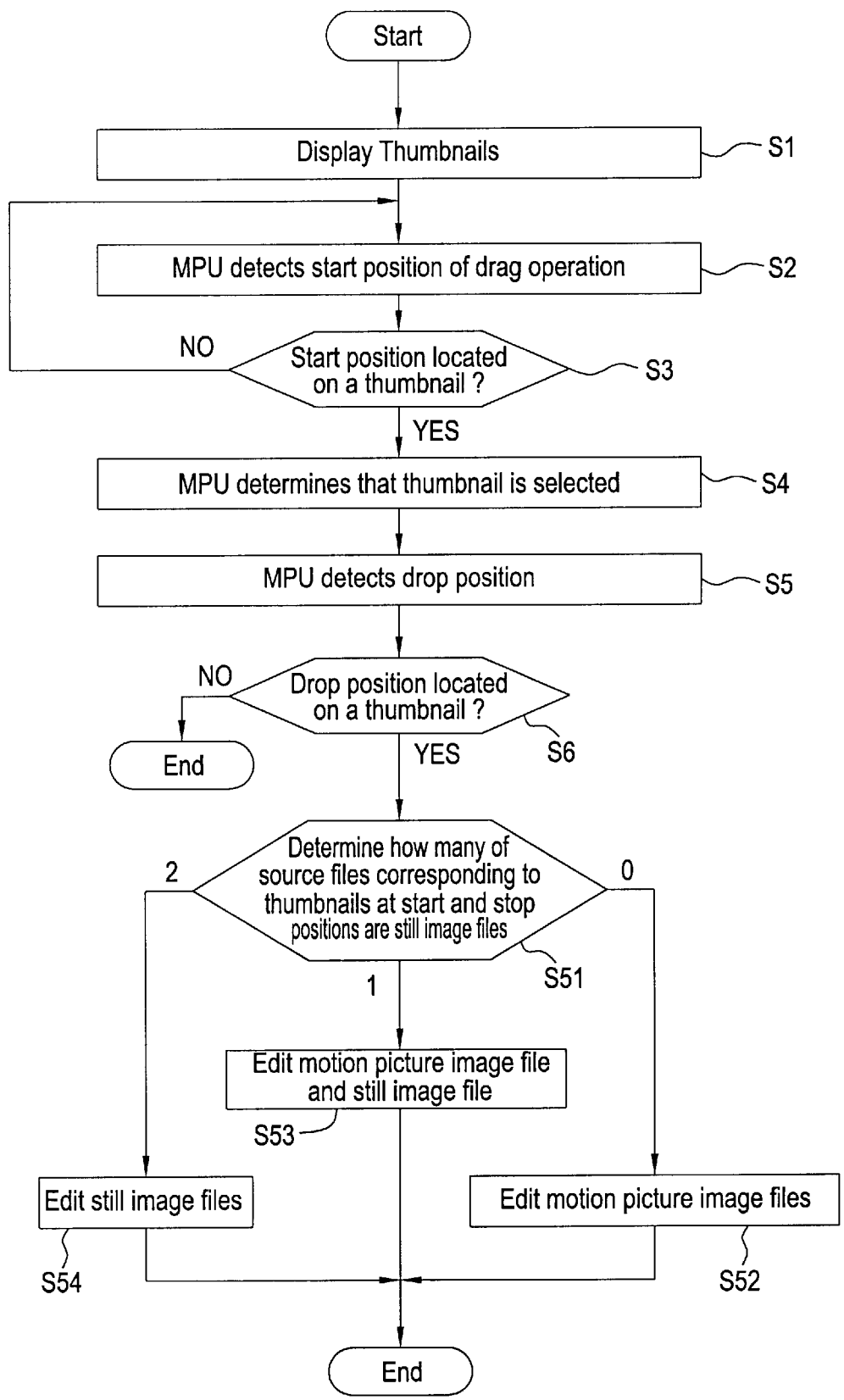
FIG. 5 is a flowchart outlining operation of a third preferred embodiment according to the present invention.

FIG. 5 shows the operational flow of the third embodiment. The operation of the third embodiment will be described with reference to FIGS. 2 and 5.

The image pick-up unit 19 photoelectrically converts an external image to electric signals and outputs the image signal to the image processor 14. The image signal processed by the image processor 14 is stored in the recording medium 18 as a motion picture image file. Both a moving picture file and a still image file are recorded in the recording media 18.

The display controller of the MPU 11 reads image files recorded on the recording medium 18 and starts the process shown in FIG. 5. Steps S1–S6 in the third embodiment are the same as in the second with the exception that still image files are stored in the recording medium 18. Thus, detailed explanation of steps S1–S6 in FIG. 5 will be omitted.

If the decision in step S6 of FIG. 5 is affirmative, control continues to step S51. The MPU 11 examines the attributes of the two selected files and determines whether one of the selected files is a still picture file.

When neither of the selected files is determined to be a still picture file in step S51, the two files are moving picture files. Thus, control advances to step S52. In step S52, the two files can be processed by the editing of moving picture files. Here, the file manager of the MPU 11 edits the two moving picture files in a format that links and sequences the two moving picture files. The linkage order of the moving picture files at this time is predetermined.

When it is determined in step S51 that one of the two selected files is a moving picture file and the other is a still picture file, control advances to step S53. In step S53, the file manager of the MPU 11 performs linked editing of the still picture file and the moving picture file. This can be realized by editing the picture files so that, when viewed as a motion picture, the still picture file is reproduced for a fixed time, and then the moving picture file is reproduced consecutively.

When it is determined in step S51 that the two selected image files are both still picture files, control advances to step S54. In step S54, linked editing is performed on the two still picture files. The file manager of the MPU 11 newly creates an image file of a format in which the two still picture files are reproduced for a fixed time, and are reproduced consecutively, when viewed as a motion picture. From steps S52, S53 and S54, the process ends.

Thus, in the third embodiment, the operator can select both a motion picture image file and a still image file as a subject for editing, and can combine the motion picture image file and the still image file.

Although use of a touch panel or a mouse as a drag-and-drop device is described above in the first through third embodiments, the invention is not limited to a touch panel or a mouse. For example, a cursor key or cross-directional control key can be used for drag-and-drop.

Although an image taken by the image pick-up unit 19 is used in the first through third embodiments, the invention is not limited to this. Image data can be obtained from other sources as long as the image data format is the same.

In the first, second and third embodiments, two thumbnails are selected with a single drag-and-drop manipulation. However, the invention is not limited to this. A structure in which three or more thumbnails are selected by successively executing multiple drag-and-drop manipulations is also included in the scope of the invention.

In the first embodiment, the frame of the selected thumbnail is highlighted to clearly identify the selected thumbnail. However, the selected thumbnail can also be identified in other ways. For example, the selected thumbnail can be emphasized by an inverted display or a blinking display or by changing the color or shape of the thumbnail.

In the first preferred embodiment, linkage, fade in, and fade out have been mentioned as methods of editing two moving picture files. Additional methods of editing can also be used. For example, the two moving picture files can be edited by linked reproduction adding special effects such as overlapping, chroma-key, wipe, and the like.

The recording media 18 can include magnetic recording media, optical-magnetic recording media or semiconductor recording media. Preferably, recording media that are removable from the apparatus and that can perform high-speed reading and high-speed writing are used.

Furthermore, recording media that can perform recording and reading of information while rotating at a high-speed are preferred. In the case of exchangeable recording media such as cassette tapes, video tapes and the like, image information requiring large-volume memory capacity can be handled.

Disk-type media such as MO (magneto-optical disk), DVD (digital video disk), HD (hard disk), and the like, can also be used. These media, compared with tape, are superior in random accessibility, and the operations of recording, deleting, and editing of image files are improved. However, the present invention is not limited to these recording media.

In summary, in the source file editing apparatus according to the invention at least two source files can be intuitively and easily selected by one drag-and-drop operation, thus halving the number of operations required in the prior art.

In addition, because an input means having a mouse, or the like, is not required, a source file editing apparatus superior in portability can be realized.

Selected source files can be linked automatically, and special effect composition (e.g., overlap, chroma-key, fade in, fade out, wipe, and the like) can be applied automatically for the selected source files. In addition, because editing menus are displayed, diverse editing contents can be selected, and the appropriate editing can be applied for the selected source files.

Image files and audio files can both be identified and linked. Consequently, audio files can be after-recorded automatically onto image files.

In addition, an operator can perform the two operations of "selection of the editing object" and "sorting of the thumbnails" by a single drag-and-drop operation.

Editing of erroneously selected source files is prevented by changing the display of a thumbnail when the operator selects a thumbnail and its corresponding source file. In addition, the display of a thumbnail can be changed to indicate that the corresponding source file was edited.

According to the invention both static picture files and other source files can be linked automatically, allowing advanced editing operations to be performed intuitively with simple operations. Furthermore, because the editing operations can be performed efficiently even on a small display screen, a portable source file editing apparatus can be realized effectively.

While this invention has been described in conjunction with specific embodiments outlined above, it is evident that many alternatives, modifications and variations will be apparent to those skilled in the art. For example, a microcomputer, microprocessor, or other electronic device such as a hardwired electronic circuit could be used instead of the MPU 11 to control the operations shown in FIGS. 3–5. Accordingly, the preferred embodiments of the invention as set forth herein are intended to be illustrative, not limiting. Various changes may be made without departing from the scope of the invention as defined in the following claims.

What is claimed is:

1. An electronic camera comprising in one portable unit:
   a display screen;
   a photoelectric converter to convert an image into output electronic image information;
   a memory device to store a source file containing the image information output by the photoelectric converter or audio information;
   a display to display thumbnails corresponding to a plurality of the source files on the display screen;
   a manipulation detector to detect a selecting manipulation to select a plurality of thumbnails on the display screen; and
   a file management device to select a first source file corresponding to a first selecting position and a second source file corresponding to a second selecting position for editing, wherein the display further displays a thumbnail corresponding to the first source file near the second selecting position.

2. The electronic camera according to claim 1, wherein the manipulation detector includes a touch panel that detects a position of a contact body contacting a surface of the touch panel.

3. The electronic camera according to claim 1, wherein the first and second source files contain image information and the file management device couples the first source file with the second source file in a time sequential manner so that the two source files are continuously reproduced in sequence when viewed as a motion picture.

4. The electronic camera according to claim 1, wherein the file management device executes special effect composition on the selected first and second source files.

5. The electronic camera according to claim 1, wherein the display displays an editing menu on the display screen upon accomplishing the selecting manipulation, and the file management device edits the first source file and the second source file in accordance with the editing item selected from the editing menu.

6. The electronic camera according to claim 1, wherein the file management device edits an image file and an audio file selected by the selecting manipulation so that the image file and the audio file are simultaneously reproduced when viewed as a motion picture.

7. The electronic camera according to claim 1, wherein the second source file comprises two source files and the display receives the second selecting position detected by the manipulation detector, and when the second selecting position is located between two thumbnails on the screen, the display inserts the thumbnail of the first selecting position between the two thumbnails and rearranges the display of the thumbnails on the screen.

8. The electronic camera according to claim 1, wherein the second source file comprises two source files and the display receives the second selecting position detected by the manipulation detector, and when the second selecting position is located between a thumbnail on the screen and a border of the screen, the display inserts the thumbnail of the first selecting position between the thumbnail on the screen and the border of the screen, and rearranges the display of the thumbnails on the screen.

9. The electronic camera according to claim 1, wherein the display changes the display form of the first and second thumbnails, respectively, to a predetermined display form to indicate the thumbnails are selected for editing.

10. The electronic camera according to claim 1, wherein the display changes the display form of a thumbnail to a predetermined display form to indicate that the source file corresponding to the thumbnail has been edited by the file management device.

11. The electronic camera according to claim 3, wherein when one of the source files selected by the selecting manipulation is a still image file, the file management device couples the still image file with the other selected source file so that the still image file is reproduced for a predetermined period of time when viewed as a motion picture.

12. The electronic camera according to claim 1, wherein the thumbnail displayed on the display screen is manipulated directly by the manipulation detector.

13. The electronic camera according to claim 1, wherein the manipulation detector is overlapped with the display screen.

14. A method for editing source files using an electronic camera, wherein the electronic camera includes in one portable unit, a photoelectric converter to convert an image into output electronic image information, a memory device to store a source file containing the image information output by the photoelectric converter or audio information, a display to display thumbnails corresponding to a plurality of the source image files on a display screen, a manipulation detector to detect a plurality of the thumbnails on the display screen, and a file management device to select a first source file corresponding to a first selecting position and a second source file corresponding to a second selecting position for editing, the method comprising the steps of:
performing a selecting operation;
selecting a first thumbnail located near the first selecting position;
selecting a second thumbnail located near the second selecting position;
editing the source files corresponding to the first and second thumbnails; and
displaying the first thumbnail near the second selecting position.

15. The method of claim 14, further comprising editing the source files corresponding to the first and second thumbnails automatically when the selecting operation is completed.

16. The method of claim 14, further comprising selecting an editing operation from an editing menu before editing the source files corresponding to the selected thumbnails.

17. The method of claim 14, further comprising changing the display form of at least one of the first and second thumbnails to indicate that the at least one thumbnail has been selected.

18. The method of claim 14, further comprising changing the display form of at least one of the first and second thumbnails to indicate that the at least one thumbnail has been edited.

19. The method of claim 14, wherein the first thumbnail is selected when a center of the first thumbnail is within a predetermined distance of the first selecting position and the second thumbnail is selected when a center of the second thumbnail is within a predetermined distance of the second selecting position.

20. The method of claim 19, wherein the predetermined distance defines an area that is smaller than an area of a thumbnail.

21. The method of claim 14, wherein the selecting operation is performed using a touch panel.

22. The method of claim 14, wherein the editing comprises coupling the selected source files in a time sequence.

23. The method of claim 22, wherein when one of the selected source files is a still image file, the editing comprises coupling the still image file with the other selected source file so that the still image file is reproduced for a predetermined period of time when viewed as a motion picture.

24. The method of claim 14, wherein when one of the selected source files is an audio file and the other selected source file is an image file, the editing comprises combining the source files so that the image file and the audio file are simultaneously reproduced when viewed as a motion picture.

25. The method of claim 14, wherein displaying the first thumbnail near the second selecting position comprises displaying the first thumbnail between the second thumbnail and a third thumbnail and rearranging the thumbnails in the display when the first thumbnail is within a predetermined distance of a region between the second thumbnail and the third thumbnail.

26. The method of claim 14, wherein displaying the first thumbnail near the second selecting position comprises displaying the first thumbnail between the second thumbnail and a display border and rearranging the thumbnails in the display when the first thumbnail is within a predetermined distance of a region between the second thumbnail and the display border.

27. An electronic camera comprising in one portable unit:
a display screen;
imaging means for receiving an optical image, converting the optical image to an image signal, and outputting image information;
recording means for recording a source file containing the image information output by the imaging means or audio information;
display means for displaying thumbnails corresponding to a plurality of the source files;
manipulation detecting means for detecting a selecting manipulation for selecting a plurality of thumbnails on the display screen; and
file management means for selecting a first source file corresponding to a first selecting position and a second source file corresponding to a second selecting position for editing, wherein the display means further displays a thumbnail corresponding to the first source file near the second selecting position.

28. The electronic camera according to claim 27, wherein the manipulation detecting means includes a touch panel that detects a position of a contact body contacting a surface of the touch panel.

29. The electronic camera according to claim 27, wherein the first and second source files contain image information and the file management means couples the first source file with the second source file in a time sequential manner so that the two source files are continuously reproduced in sequence when viewed as a motion picture.

30. The electronic camera according to claim 27, wherein the file management means edits an image file and an audio file selected by the selecting manipulation so that the image file and the audio file are simultaneously reproduced when viewed as a motion picture.

31. The electronic camera according to claim 27, wherein the second source file comprises two source files and the display means receives the second selecting position detected by the manipulation detecting means, and when the second selecting position is located between two thumbnails on the screen, the display means inserts the thumbnail of the first selecting position between the two thumbnails and rearranges the display of the thumbnails on the screen.

32. The electronic camera according to claim 27, wherein the second source file comprises two source files and the display means receives the second selecting position detected by the manipulation detecting means, and when the second selecting position is located between a thumbnail on the screen and a border of the screen, the display means inserts the thumbnail of the first selecting position between the thumbnail on the screen and the border of the screen, and rearranges the display of the thumbnails on the screen.

33. The electronic camera according to claim 27, wherein the display means changes the display form of the first and second thumbnails, respectively, to a predetermined display form to indicate the thumbnails are selected for editing.

34. The electronic camera according to claim 27, wherein the thumbnail displayed on the display screen is manipulated directly by the manipulation detecting means.

35. The electronic camera according to claim 27, wherein the manipulation detecting means is overlapped with the display area.

36. The electronic camera according to claim 1, wherein the manipulation detector detects a drag-and-drop manipulation as the selecting manipulation.

37. The electronic camera according to claim 36, wherein a drag-and-drop start position corresponds to the first selecting position, and a drag-and-drop end position corresponds to the second selecting position.

38. The method of claim 14, wherein the selecting operation is performed using a drag-and-drop operation.

39. The method of claim 38, wherein a drag-and-drop start position corresponds to the first selecting position, and a drag-and-drop end position corresponds to the second selecting position.

40. The electronic camera according to claim 27, wherein the manipulation detecting means detects a drag-and-drop manipulation as the selecting manipulation.

41. The electronic camera according to claim 40, wherein a drag-and-drop start position corresponds to the first selecting position, and a drag-and-drop end position corresponds to the second selecting position.

* * * * *